United States Patent
Hofmann et al.

(10) Patent No.: US 9,851,241 B2
(45) Date of Patent: Dec. 26, 2017

(54) METHOD FOR CALIBRATING WIM-SENSORS

(75) Inventors: Adrian Hofmann, Ellikon am Rhein (CH); David Cornu, Bellinzona (CH); Reto Calderara, Winterberg (CH)

(73) Assignee: KISTLER HOLDING AG, Winterthur (CH)

( * ) Notice: Subject to any disclaimer, the term of this patent is extended or adjusted under 35 U.S.C. 154(b) by 667 days.

(21) Appl. No.: 13/637,930

(22) PCT Filed: Mar. 24, 2011

(86) PCT No.: PCT/CH2011/000060
§ 371 (c)(1),
(2), (4) Date: Sep. 27, 2012

(87) PCT Pub. No.: WO2011/120176
PCT Pub. Date: Oct. 6, 2011

(65) Prior Publication Data
US 2013/0024152 A1 Jan. 24, 2013

(30) Foreign Application Priority Data
Apr. 1, 2010 (CH) ........................................ 486/10

(51) Int. Cl.
*G01G 19/02* (2006.01)
*G01G 23/01* (2006.01)
(52) U.S. Cl.
CPC ........... *G01G 19/022* (2013.01); *G01G 23/01* (2013.01)
(58) Field of Classification Search
CPC .............................. G01G 23/01; G01G 19/022
(Continued)

(56) References Cited

U.S. PATENT DOCUMENTS 5,065,618 A * 11/1991 Hodges et al. ................. 73/146
2002/0059075 A1 * 5/2002 Schick et al. ..................... 705/1
(Continued)

FOREIGN PATENT DOCUMENTS

DE     4218929 C1    9/1993
DE     10115490     *   6/2002
(Continued)

OTHER PUBLICATIONS

Website: Hyperphysics: Young's modulus, http://hyperphysics.phy-astr.gsu.edu/hbase/permot3.html, updated Mar. 30, 2010.*
(Continued)

*Primary Examiner* — Sujoy Kundu
*Assistant Examiner* — Catherine Rastovski
(74) *Attorney, Agent, or Firm* — Dority & Manning, P.A.

(57) ABSTRACT

A method for calibrating a WIM (Weigh in Motion) sensor built into a road during travel of a calibrating vehicle measures the dynamic wheel force on the road and on the WIM sensor directly at the measuring wheel, depending on time or location. These wheel force data are transmitted to an evaluating unit. As the calibrating vehicle passes over, WIM signal data are simultaneously measured at the WIM sensor and transmitted to the evaluating unit. The wheel force data are synchronized with the WIM signal data in the evaluating unit. A calibration function is determined by comparing the dynamic wheel force data with the WIM signal data.

8 Claims, 1 Drawing Sheet

(58) Field of Classification Search
USPC .............................. 702/101, 173; 73/862.642
See application file for complete search history.

(56) References Cited

U.S. PATENT DOCUMENTS

| | | | | |
|---|---|---|---|---|
| 2006/0037409 A1* | 2/2006 | Ichige | ..................... | G01L 5/161 73/862 |
| 2008/0271541 A1* | 11/2008 | Neuman | ................ | G01G 19/12 73/767 |
| 2009/0151421 A1* | 6/2009 | Susor | .............................. | 73/1.13 |
| 2009/0322048 A1* | 12/2009 | Glavinic et al. | ............. | 280/86.5 |

FOREIGN PATENT DOCUMENTS

| | | | |
|---|---|---|---|
| DE | 10115490 C1 | | 6/2002 |
| EP | 1780524 | * | 5/2007 |
| EP | 1780524 A2 | | 5/2007 |
| JP | 2001-174320 | | 6/2001 |
| JP | 2006-226812 | | 8/2006 |
| WO | 2009/109158 A1 | | 9/2009 |

OTHER PUBLICATIONS

F.J. van Loo and G. Visser, "Vehicle for Dynamic Calibration of a Multiple Sensor Weigh-in-Motion system", Proceeding 8th Intl. Symp. on Heavy Vehicle Weights and Dimensions (2004).*
English translation of International Preliminary Report on Patentability, dated Oct. 2, 2012.
International Search Report, dated Jul. 21, 2011.

* cited by examiner

METHOD FOR CALIBRATING WIM-SENSORS

CROSS-REFERENCE TO RELATED APPLICATIONS

This application claims priority to International Application Serial No. PCT/CH2011/000060 filed Mar. 24, 2011, which claims priority to Swiss Application No. CH 486/10 filed Apr. 1, 2010. International Application Serial No. PCT/CH2011/000060 is hereby incorporated herein for all purposes by this reference.

FIELD OF THE INVENTION

The invention relates to a method for calibrating a WIM (Weigh-in-Motion) sensor built into a road, the sensor being suitable for determining the dynamic and/or static weight of a vehicle as it is passing over the WIM-sensor.

BACKGROUND

Typical WIM systems comprise two induction loops for the classification of vehicles as well as two series of WIM-sensors, which are built into a road spaced apart approx. 4 m from one another. The WIM-sensors detect signals on the basis of the loads that are transferred from the vehicle via the individual wheels in each case to the road or to the sensor. With the aid of ascertained calibration factors or calibration functions, the signals are finally converted into static or dynamic loads. It has been shown that the dynamic loads can diverge from the static loads, this being due in particular to the aerodynamics of the vehicles and the condition of their springs. In order to ascertain a weight of a vehicle, the individual ascertained loads of all the wheels assigned to this vehicle are finally added up. The same applies to vehicles with trailers. In order to increase the accuracy, a plurality of such WIM systems behind one another is sometimes provided and the ascertained measurement values as are evaluated.

WIM sensors are if possible built into straight sections of road, where they are passed over by vehicles experiencing as smooth a ride as possible. In particular, the vehicles should not be rocked by curves, gradients or slopes or by bumps, since this would falsify the measurement.

The measurement data pass into a WIM evaluating unit, which is typically housed in a cabinet at the roadside. From there, they are conveyed via lines and/or transmission antennas to a monitoring station, where the necessary measures are finally initiated by the persons responsible when, for example, permitted weights are exceeded. The measurement data in particular allow information to be derived about the load acting on the road, in order that surfacing work for example can be carried out in good time before considerable damage occurs.

A calibration of a weighbridge for rail vehicles is described in DE 10115490. For this purpose, a reference vehicle provided with vehicle weighing devices above each wheel is precisely weighed statically. The reference vehicle then passes over the weighbridge. The latter comprises a section of rail with integrated measurement sections, in which the load can be detected dynamically and transmitted to an evaluating unit. For the calibration, the weights ascertained statically on the reference vehicle are finally matched with the rail loads ascertained dynamically. Here too, dynamic loads are calibrated through static loads, as described at the outset. Errors caused by the aerodynamics of the vehicles and the condition of the springs also occur here.

The WIM sensors have to be recalibrated from time to time in order to permit the reliable determination of the weights of the vehicles passing over them. Nowadays, such a calibration is carried out with a statically weighed lorry. The latter passes over the measurement point to be calibrated between 10 and 70 times in order to achieve statistical reliability against random variations. These variations usually originate from the spring behavior of the vehicle.

This process is very time-consuming and expensive and is carried out about once per year for each WIM measurement point.

BRIEF SUMMARY OF THE INVENTION

The problem of the present invention is to describe a new calibration method, which can be carried out more easily and more quickly and which provides greater accuracy than the previously known methods. In addition, it is desired to verify the quality of the approach section before the sensor, since it is directly connected with the accuracy of the measurement.

The invention is solved by a method according to the following description. The inventive idea consists in the fact that the WIM sensor is passed over by a calibrating vehicle which is equipped with at least one measuring wheel. The dynamic wheel force on the road and on the WIM sensor is measured during travel directly at the measuring wheel, depending on time or location. The ascertained wheel force data are then transmitted to an evaluating unit. In addition, as the calibrating vehicle passes over, WIM signal data are at the same time measured at the WIM sensor and transmitted to the evaluating unit. The wheel force data are finally synchronised with the WIM signal data in said evaluating unit. A calibration function, which is finally used for the calibration of the WIM sensors, is determined on the basis of the comparison of the dynamic wheel force data with the WIM signal data.

This method enables a calibration of the WIM sensors after they are passed over only once. Further advantageous developments are described below.

BRIEF DESCRIPTION OF THE DRAWINGS

The invention is explained in greater detail below by reference to the drawings. In the figures.

DESCRIPTION OF EXEMPLARY EMBODIMENTS OF THE INVENTION

Figure 1:
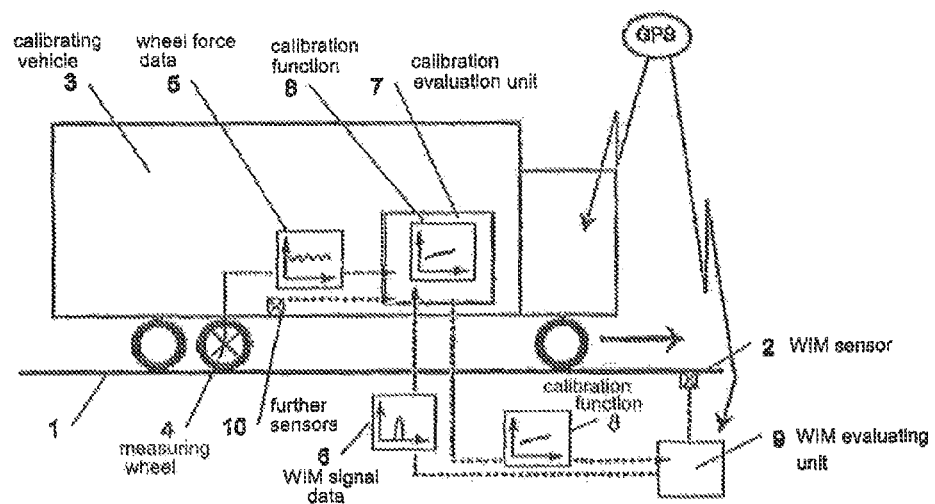
FIG. 1 shows a schematic representation, according to the invention, of a calibrating vehicle before passing over a WIM sensor.

FIG. 1 shows a road 1 with a WIM sensor 2 (Weigh in Motion) built therein, said WIM sensor being connected to a WIM evaluating unit 9. A calibrating vehicle 3 is represented on road 1, here in the form of a lorry. The arrow direction indicates the driving direction of calibrating vehicle 3.

WIM sensor 2 in each case measures dynamic signal S of a vehicle 3 as it passes over, and this measurement is schematically represented in FIG. 1 as time-dependent WIM signal data 6. After the measurement, said data are relayed to WIM evaluating unit 9 and are amplified there if need be, evaluated and/or processed in another form.

At least one of the wheels of calibrating vehicle 3 is fitted with a measuring wheel 4, which permits the dynamic wheel force, which is acting in each case on the road or on the WIM sensor, to be ascertained during travel. These wheel force data 5 can be measured time- or location-dependent. These data 5 can also be amplified, evaluated and/or processed in another form.

Both data sets, WIM signal data 6 and wheel force data 5, are transmitted to a calibration-evaluating unit 7. This evaluating unit 7 can be in calibrating vehicle 3 or in a stationary device. Both data sets 5, 6 are synchronised in this evaluating unit 7. Using a comparison of these two data sets 5, 6, a calibration function is finally determined, which serves to calibrate the WIM sensor. In addition, further data can enter into the determination of calibration function 8. These may be, in particular, correction factors which take account of differences between the dynamic and the static wheel force. Such correction factors can be determined for example on the basis of empirical values or on the basis of the actually measured static wheel force from measuring wheel 4.

A measuring wheel is a rotating wheel force dynamometer and forms a unit comprising measurement cells and rim-side and hub-side adaptation, which in itself is rigid. The unit itself rotates with the hub, the transmission of the measurement data taking place either by telemetry or by means of a slip ring. A measuring wheel measures the occurring forces directly and very precisely, this being an essential requirement for the calibration of WIM sensors. As a rule, a calibration instrument must have a much higher accuracy than the measurement instrument to be calibrated.

Instead of the direct wheel force measurement by means of a measuring wheel, information could be derived about the wheel force indirectly, for example by a tyre pressure measurement. However, the required accuracy for the present calibration cannot be achieved. A further alternative includes wheel hub measurements or axle deformation measurements, which however must be provided on the vehicle. This means that the calibrating vehicle always has to be calibrated itself before it can be used. In the case where use is made of a measuring wheel, only the measuring wheel itself has to be calibrated. Thereafter, it can be fitted to any vehicle suitable in size and immediately delivers highly precise data. WIM sensors can thus be calibrated load-dependent with different vehicles or trailers, wherein only the measuring wheel has to be refitted.

Figure 2:
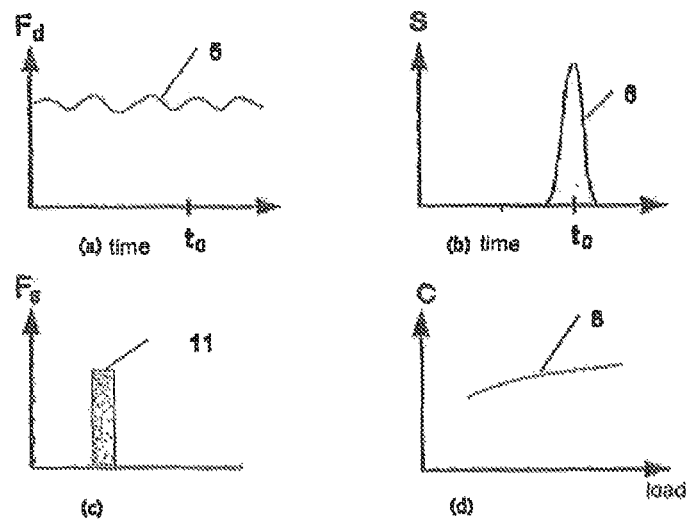
FIG. 2 shows schematic representations of (a) dynamic wheel force data, (b) WIM signal data, (c) of a static wheel force and (d) a calibration function.

In FIG. 2, dynamic wheel force data 5 are represented in (a) and WIM signal data 6 in (b). Dynamic wheel force data 5 indicate a time- or location-dependent function of the wheel forces, which are measured before, during and after the passage over WIM sensor 2. Values $F_d$ are essentially constant, but subject to small fluctuations, which are caused by the road surface, but also by different wind conditions in connection with the aerodynamics of the vehicle. At the same time as the picking-up of wheel force data 5, a GPS signal is received and stored, which supplies either the respective precise location of measuring wheel 4 or the respective precise times of all ascertained wheel force data 5.

The same GPS signal is also received and stored with WIM signal data 6. WIM signal S in FIG. 2 (*b*) is always time-dependent and in each case zero, apart from the time interval during which by a vehicle wheel is passing over. During this event, the load in each case increases rapidly to a maximum and falls back again to zero after the vehicle wheel has left.

On the one hand, during the detection of the two measurement data sets 5, 6 in the synchronisation, the GPS time signal can also be detected and time $t_0$ can then be ascertained at which WIM sensor 2 is passed over by measuring wheel 4. At this time $t_0$, WIM measurement signal S is for example at a maximum, in the case of a narrow WIM sensor 2. During the synchronisation, dynamic wheel force $F_d$, which has been ascertained at time $t_0$, is then accordingly determined.

On the other hand, the respective GPS location signal can also be detected at measuring wheel 4 together with the detection of dynamic wheel force data $F_d$ for the synchronisation. Wheel force data $F_d$, which have finally been measured at the location where static WIM sensor 2 receives the same GPS location signal, are correspondingly used for the calibration. These wheel force data $F_d$ are also measured exactly at time $t_0$ when WIM sensor 2 is crossed over.

Calibration function 8 can finally be determined using the comparison of measured dynamic wheel force $F_d$ as it crosses over WIM sensor 2 with measured signal S on the WIM sensor, caused by the measuring wheel. The result is calibration values C, which can be a constant value or a function, for example a function of the load. Possible calibration values C are represented as a function of the load in FIG. 2 (*d*).

FIG. 2 (*c*) finally indicates static wheel force 11 of measuring wheel 4. This is a scalar value $F_s$ and can be ascertained for example by means of a balance or by means of the measuring wheel itself, in a stationary position.

Differences between dynamic wheel force $F_d$ and static wheel force $F_s$ can occur for example due to the aerodynamics of the vehicle. With the inclusion of these differences in calibration data C, the static load of a vehicle 3 is deduced on the basis of WIM signal measurements. This is crucial if overloaded vehicles 3 are to be ascertained. If, however, the overall loading of a road is to be ascertained, for example to establish the need for renovation, it is on the contrary the dynamic load that is of interest. It is also possible to store two calibration functions in order to be able to derive information simultaneously about static and dynamic loads, which are then used accordingly.

Ascertained data sets 5, 6, 11 can be stored in each case in calibrating vehicle 3 or in WIM evaluating unit 9 and later be fed to a common evaluating unit 7, where they are finally evaluated. It is however more convenient to bring data sets 5, 6, 11 together during or directly after the crossing-over, whereby at least one of data sets 5, 6 is transmitted contactless to evaluating unit 7. If the latter is located in calibrating vehicle 3, the WIM signal data would have to be transmitted contactless into calibrating vehicle 3. After ascertainment of calibration function 8, the latter can then be transmitted preferably also contactless into WIM evaluating unit 9, where it is henceforth available for subsequent measurements.

Investigations have shown that the quality of approach road 1 before the WIM sensor is of great importance for the measurement accuracy of WIM measurement data 6. Potholes or bumps in the road can rock a vehicle 3 and greatly falsify the measurement. It is therefore desirable to be able to assess the state of the road in the approach section. For this purpose, it has proved to be helpful to ascertain additional data on calibrating vehicle 3 concerning the road condition. These additional data can be ascertained for example with measuring wheel 4 or with additional sensors 10, which are fitted to calibrating vehicle 3. Examples of such additional sensors are in particular distance measuring devices, acceleration sensors and/or spring travel measurement sensors. The latter can ascertain how smoothly, uniformly and acceleration-free the approach runs in the vertical direction. In the event of bumps being ascertained, appropriate measures can be taken, for example surfacing work.

It has been shown that the calibration method according to the invention is much simpler, quicker and less expensive than the conventional method. As a rule, one or two measurements are sufficient. The measurements must at most be repeated if external conditions such as ruts have falsified the measurement. This is manifested in a disproportionately high increase in wheel force data 5 at the time of passing over the WIM sensor compared with the data during the approach to the latter.

LIST OF REFERENCE NUMBERS

1 road
2 WIM sensor (Weigh-in-Motion Sensor)
3 vehicle, calibrating vehicle
4 measuring wheel
5 wheel force data $F_d$
6 WIM signal data S
7 evaluating unit, calibration-evaluating unit
8 calibration function, calibration data C
9 WIM evaluating unit
10 further sensors
11 static wheel load $F_s$

The invention claimed is:

1. A method for calibrating a WIM (Weigh in Motion) sensor built into a road, the sensor being suitable for determining the dynamic and/or static weight of a vehicle as it is passing over the WIM-sensor, the method comprising:
   static wheel force data is obtained from a measuring wheel of a calibrating vehicle, which measuring wheel includes a hub and a rotating wheel force dynamometer, which rotates with the hub of the measuring wheel and includes rim-side and hub-side adaptions, while the calibrating vehicle is in a stationary position and the measuring wheel is not rotating;
   transmitting the measured static wheel force data to an evaluating unit;
   while passing the calibrating vehicle over the road and the WIM sensor, obtaining dynamic wheel force data from directly measuring at the measuring wheel the dynamic wheel force on the road;
   transmitting the dynamic wheel force data to the evaluating unit;
   using the evaluating unit to ascertain the differences between the dynamic wheel force data and the static wheel force data to generate corrected dynamic wheel force data;
   while passing the measuring wheel of the calibrating vehicle over the road and the WIM sensor, WIM signal data generated by the WIM sensor are transmitted to the evaluating unit;
   using the evaluating unit to synchronize the corrected dynamic wheel force data with the WIM signal data;
   using the evaluating unit to compare the corrected dynamic wheel force data that has been synchronized with the WIM signal data and generate from the comparison a calibration function that accounts for the differences between the dynamic wheel force data and the static wheel force data; and
   using the calibration function to calibrate the WIM sensor.

2. The method according to claim 1, wherein static wheel force R is also ascertained from measuring wheel on a road and is included in the determination of the calibration function.

3. The method according to claim 1, wherein the synchronization is carried out by means of a received GPS-time and/or GPS-position.

4. The method according to claim 1, wherein the dynamic wheel force data and/or the WIM signal data are transmitted contactless to the evaluating unit.

5. The method according to claim 1, wherein additional data concerning the road condition are ascertained on the calibrating vehicle in the area before the passage over the WIM sensor.

6. The method according to claim 1, wherein additional data are ascertained with the measuring wheel or with at least one additional sensor fitted to the calibrating vehicle, the at least one additional sensor being chosen from the following sensors: distance measuring devices, acceleration sensors and/or spring travel measurement sensors.

7. The method according to claim 1, further comprising the step of obtaining additional dynamic wheel force data from a force measurement taken at the measuring wheel before the measuring wheel passes over the WIM sensor.

8. The method according to claim 7, further comprising the step of obtaining additional dynamic wheel force data from a force measurement taken at the measuring wheel after the measuring wheel passes over the WIM sensor.

* * * * *